US012623770B2

(12) United States Patent
Dagorn et al.

(10) Patent No.: US 12,623,770 B2
(45) Date of Patent: May 12, 2026

(54) CONTROL DEVICE AND METHOD FOR MONITORING SUCH A CONTROL DEVICE

(71) Applicant: AIRBUS HELICOPTERS, Marignane Cedex (FR)

(72) Inventors: Gaël Dagorn, Mittelhausbergen (FR); John McElhone, Marseilles (FR); Pascal Izzo, Berre L'etang (FR); Adrien Ott, Salon de Provence (FR)

(73) Assignee: AIRBUS HELICOPTERS, Marignane Cedex (FR)

( * ) Notice: Subject to any disclaimer, the term of this patent is extended or adjusted under 35 U.S.C. 154(b) by 0 days.

(21) Appl. No.: 19/002,484

(22) Filed: Dec. 26, 2024

(65) Prior Publication Data

US 2025/0368318 A1      Dec. 4, 2025

(30) Foreign Application Priority Data

Jun. 4, 2024    (FR) ...................................... 2405848

(51) Int. Cl.
| | |
|---|---|
| *B64C 13/10* | (2006.01) |
| *B64C 13/50* | (2006.01) |
| *F16H 59/10* | (2006.01) |
| *G01D 5/12* | (2006.01) |
| *G05G 9/047* | (2006.01) |

(52) U.S. Cl.
CPC .............. *B64C 13/10* (2013.01); *B64C 13/50* (2013.01); *F16H 59/105* (2013.01); *G01D 5/12* (2013.01); *G05G 2009/04755* (2013.01)

(58) Field of Classification Search
CPC ....... B64C 13/10; B64C 13/50; B64C 13/503; G01D 5/12; G01D 5/145; G05G 9/047; G05G 2009/04755; F16H 59/105
See application file for complete search history.

(56) References Cited

U.S. PATENT DOCUMENTS

| | | | |
|---|---|---|---|
| 5,160,918 A | 11/1992 | Saposnik et al. | |
| 5,532,476 A | 7/1996 | Mikan | |
| 7,411,521 B2 | 8/2008 | Lewis et al. | |
| 7,757,579 B2 | 7/2010 | Bloch | |
| 10,528,074 B1 * | 1/2020 | Olsson ................. | G06F 3/0338 |
| 2019/0056241 A1 * | 2/2019 | Vuillermet ............. | G01D 5/165 |

OTHER PUBLICATIONS

French Search Report for French Application No. FR2405848, Completed by the French Patent Office, Dated Nov. 21, 2024, 9 pages.

* cited by examiner

*Primary Examiner* — Deeprose Subedi
(74) *Attorney, Agent, or Firm* — BROOKS KUSHMAN P.C.

(57) ABSTRACT

A control device comprising a lever provided with a magnetic dipole and able to move, at least in rotation, relative to a support about an axis. The control device includes a measuring device configured to measure a magnetic field generated by the magnetic dipole, and a monitoring system for monitoring the integrity of the control device. The monitoring system is configured to signal an anomaly using an alarm when a first norm of a first vector difference between the current magnetic field and a first reference magnetic field relating to an estimated orientation of the lever, is greater than a first magnetic field threshold for a duration greater than a duration threshold.

10 Claims, 3 Drawing Sheets

CONTROL DEVICE AND METHOD FOR MONITORING SUCH A CONTROL DEVICE

CROSS REFERENCE TO RELATED APPLICATION

This application claims priority to French Patent Application No. FR 24 05848 filed on Jun. 4, 2024, the disclosure of which is incorporated in its entirety by reference herein.

TECHNICAL FIELD

The present disclosure is in the technical field of controls, and more particularly relates to aircraft flight controls.

BACKGROUND

The disclosure relates to a control device and to a method for monitoring such a control device.

A control device comprises a handle, a grip or a lever that is able to move at least about one or more distinct axes, for example in rotation about two orthogonal axes. An ability of the lever to move in translation along an additional axis, for example the axis of elongation of the lever, may also be available, generally between a nominal position, also called the "neutral" position, and a so-called "actuated" or "validated" position.

The control device supplies one or more control signals carrying information relating to the movements of the lever relative to its various movement axes. The integrity of these control signals is a major issue in operational safety of control devices, particularly in the context of electrical flight control devices for an aircraft. More specifically, failures that can affect a control device may result in the emission of erroneous control signals, that will not be detected as such in the absence of safety or monitoring mechanisms. The risk of erroneous control signals being emitted can potentially be increased when the lever has the ability to move in translation along an axis of elongation of the lever.

A widespread technology for identifying the movements of the lever of a control device is based on the use of magnetic sensors. More specifically, the movement of the lever modifies a magnetic field perceived by a set of sensors. This variation in magnetic field is transformed by a calculator into a lever movement value.

This technology is described, for example, in documents U.S. Pat. Nos. 7,411,521 and 7,757,579.

In particular, document U.S. Pat. No. 7,411,521 describes a control system comprising a magnet that is attached to a lever, and fixed sensors for detecting the movements of the lever. At least two sensors, for example Hall-effect sensors, are used per axis, to detect the motion of the lever relative to a support around this axis. The control system also includes a monitoring arrangement for monitoring a signal provided by each of the sensors and enabling the control system to be operational when the signals from the sensors are within a predefined range.

Document U.S. Pat. No. 7,757,579 describes a control grip that pivots relative to a base, around two axes. The base has redundant sensors for detecting motions of the grip. For example, two Hall effect sensors are used per axis of rotation of the grip, and measure variations in a magnetic field generated by a magnet that is attached to the grip. A microprocessor compares and/or combines the outputs of the two sensors, in order to control the operation of the grip.

An alternative technology is described in document U.S. Pat. No. 5,532,476 wherein a control system comprises a lever that is able to move relative to a housing and provided with a reflective area. Several devices, both light emitting and light sensing, are arranged in the housing so as to emit light in a movement field of the reflecting area of the lever, during the motions of this lever. The light emitter/sensor device then generates an electrical signal when it senses light reflected by the reflective area of the lever, this light being reflected towards the devices only when the lever is in its "neutral" position or close to this "neutral" position.

In addition, document U.S. Pat. No. 5,160,918 is also known.

SUMMARY

An object of the present disclosure is therefore to provide an alternative solution for monitoring the integrity of a control device by using a three-dimensional measurement of a magnetic field modified by the movement of a lever of this control device.

The present disclosure relates firstly to a control device provided with a lever articulated to a support, the lever being provided with at least one magnetic dipole and able to move, at least in rotation, relative to the support about an axis X, Y, the control device comprising a measuring device configured to measure three components of a magnetic field B generated by said at least one magnetic dipole at a position of the measuring device, the control device comprising a monitoring system for monitoring the control device.

The lever may comprise a single magnetic dipole or several magnetic dipoles arranged, for example, at one end of the lever. The one or more magnetic dipoles may comprise a permanent magnet or an electromagnet.

The measuring device is configured to measure the magnetic field B generated by the one or more magnetic dipoles and sensed at a fixed position relative to the support, namely the position of this measuring device. The variations of this magnetic field B reflect the movements of the one or more magnetic dipoles relative to the support, and consequently, the movements of the lever.

The measuring device may comprise a single measuring device. Alternatively, the measuring device may comprise a plurality of measuring devices. The measuring devices can be used simultaneously in order to provide a measurement of the magnetic field B established in a known manner by combining the measurements of these measuring devices, for example by calculating the mean value or the median value, or in redundancy in order to compensate for any possible failure of one of the measuring devices.

Each of the three components of the magnetic field B can be measured independently, by the measuring device, in three non-coplanar measuring directions U, V and W respectively, forming a reference frame (U, V, W) integral with the support. These three measurement directions U, V and W are, for example, orthogonal in pairs. One or more of these three measurement directions U, V and W may optionally be respectively parallel to one or more movement axes of the lever relative to the support. The measuring device may comprise three magnetic sensors, for example Hall effect sensors, respectively associated with the three measuring directions U, V and W in order that each of the Hall effect sensors measures one of the three components of the magnetic field B.

The control device according to the disclosure is remarkable in that the monitoring system is configured to signal an anomaly using an alarm when a first predetermined function F1 is greater than a first magnetic field threshold, for a duration greater than a duration threshold, and the first predetermined function F1 is a function of the three measured components of a current magnetic field Bc and an estimated orientation of the lever, the first predetermined function F1 having as its value a first norm N1 of a first vector difference between the current magnetic field Bc and a first reference magnetic field Bref1 determined at the position of the measuring device, the first reference magnetic field Bref1 relating to the estimated orientation.

The first predetermined function F1 makes it possible to characterize the first vector difference between the current magnetic field Bc and the first reference magnetic field Bref1 that has been previously determined at the position of the measuring device for the estimated orientation of the lever. This first reference magnetic field Bref1 has been previously defined for a control device guaranteed to be fault-free, for several reference orientations of the lever relative to the axis or axes X, Y. A stored first database thus respectively associates several values of the first reference magnetic field Bref1 with the reference orientations of the lever. Thus, three components of the first reference magnetic field Bref1 are associated with each reference orientation, for example in the three measurement directions U, V and W respectively. The reference orientations of the lever stored in the first database cover all the possible orientations of the lever relative to the axis or axes X, Y, taking into account a predefined discretization step.

This first predetermined function F1 is therefore a function of the three measured components of the current magnetic field Bc, the values of the first reference magnetic field Bref1 and an estimated orientation of the lever.

The orientation of the lever relative to the support can be estimated using the magnetic field B measured by the measuring device, and in particular using its three components. A calculator of the monitoring system can estimate this orientation of the lever as a function of the three measured components of a current magnetic field Bc using one or more stored transformation laws. Alternatively, the calculator can be located outside the control device and, for example, be integrated into a centralization system of the control device, or even into an avionics system of an aircraft when the control device equips an aircraft.

The measuring device may also comprise an internal calculator for directly determining this estimated orientation of the lever as a function of the measured magnetic field B.

Alternatively, the orientation of the lever relative to the support can be measured by dedicated sensors, e.g., angular sensors positioned on the one or more movement axes X, Y of the lever.

The first predetermined function F1 supplies, as a result, the value of a first norm N1 of this first vector difference between the current magnetic field Bc and the first reference magnetic field Bref1 relating to the estimated orientation. This first predetermined function F1 can be calculated by the calculator of the monitoring system.

For example, this first norm N1 may be a Euclidean norm or a so-called "infinite" norm, or even another norm. In addition, strictly positive constants a, b and c can be used to characterize the anisotropy of the measurement accuracy of the measuring device. In this case, since the first vector difference is a vector of coordinates u, v, w, the first norm N1 can, for example, be written according to the following formula $N=max(a \cdot |u|, b \cdot |v|, c \cdot [w])$ for an infinite norm. For a Euclidean norm, the first norm N1 can then be written $N = \sqrt{a \cdot u^2 + b \cdot v^2 + c \cdot w^2}$.

The calculator of the monitoring system is also configured to compare this first norm N1 with a first magnetic field threshold. The first magnetic field threshold has been previously defined, for example by tests and/or simulations. The monitoring system thus signals an anomaly using an alarm when the first norm N1 is greater than the first magnetic field threshold for a duration greater than the duration threshold. This anomaly may, in particular, be a fault of the control device, for example a deformation or even a breaking of the lever, rendering the information provided by the control device invalid.

The alarm can then signal the presence of such a fault by emitting an alarm, for example a visual, audible or even haptic alarm, to inform an operator or an external system to which the control device is connected, such as a centralization system or a piloting device, or even an avionics system of an aircraft, of this anomaly. The use of the duration threshold advantageously makes it possible to avoid the emission of false alarms in the event of the first magnetic field threshold being exceeded by the first norm N1 in a transient manner, in this case for a duration less than or equal to the duration threshold.

In addition, when the first norm N1 is greater than the first magnetic field threshold for a duration greater than the duration threshold, the monitoring system can prohibit the sending of a control signal relating to the estimated orientation of the lever, by the control device, to, for example, a centralization system of a machine or a control device of an aircraft or any other device connected to the control device. An emergency lever of the control device may optionally be available and operated in order to compensate the anomaly detected on the lever of the control device.

The control device may also include one or more of the following features, taken singly or in combination.

According to one possibility, the first reference magnetic field Bref1 relating to the estimated orientation of the lever may be determined by interpolation from the predetermined and stored values of the first reference magnetic field Bref1 respectively associated with the reference orientation values of the lever. In this case, the calculator of the monitoring system estimates, as a function of the predetermined and stored values of the first reference magnetic field Bref1, an estimated value of the first reference magnetic field Bref1 for a reference orientation equal to the estimated orientation of the lever.

Alternatively, the first reference magnetic field Bref1 relating to the estimated orientation of the lever may be selected from among the predetermined and stored values of the first reference magnetic field Bref1 respectively associated with the reference orientation values of the lever, the selected value being associated with the reference orientation closest to the estimated orientation. In this case, the calculator of the monitoring system first searches for the reference orientation closest to the estimated orientation by a known method, then selects the value of the first reference magnetic field Bref1 corresponding to this reference orientation closest to the estimated orientation of the lever. The discretization step must then be defined such that the differences between two values of first reference magnetic fields Bref1 respectively associated with two adjacent reference orientations are less than the first magnetic field threshold. A safety margin may optionally be taken into account.

According to one possibility compatible with the preceding possibilities, the lever may be able to move in rotation relative to the support about a single axis X.

Alternatively, the lever may be able to move in rotation relative to the support about a first axis X and a second axis Y. The estimated orientation of the lever is then defined relative to the support by two angles $\theta, \phi$ around the first and second axes X, Y respectively. The first and second axes X, Y may be orthogonal to each other, and optionally coplanar.

According to one possibility compatible with the preceding possibilities, the lever may be elongate in shape, and substantially rectilinear, along an actuation axis Z and able to move in translation relative to the support along this actuation axis Z between a rest position, also called "neutral position", and an actuated position. A, for example resilient, return device can automatically return the lever to the rest position as soon as the lever is not or is no longer used by an operator.

In addition, the control device can be configured to detect whether the lever is in the actuated position when a second predetermined function F2 is less than a second magnetic field threshold, the second predetermined function F2 being a function of the three measured components of the current magnetic field Bc and the estimated orientation of the lever, the second predetermined function F2 having the value of a second norm N2 of a second vector difference between the current magnetic field Bc and a second reference magnetic field Bref2 determined at the position of the measuring device, the second reference magnetic field Bref2 relating to the estimated orientation of the lever.

The second reference magnetic field Bref2 has been previously defined for a control device guaranteed to be fault-free, the lever being in the actuated position along the actuation axis Z, for a plurality of reference orientations of the lever relative to the axis or axes X, Y. A stored second database thus associates several values of the second reference magnetic field Bref2 respectively with the reference orientations of the lever. The reference orientations of the lever stored in the second database cover all the possible orientations of the lever relative to the axis or axes X, Y, taking into account a predefined discretization step.

The reference orientations of the lever stored in the second database are preferably identical to those stored in the first database. In this case, the first and second databases can form a single database storing the reference orientations of the lever and respectively associating with them several values of the first reference magnetic field Bref1 and several values of the second reference magnetic field Bref2.

Optionally, the reference orientations of the lever stored in the first database and the second database may be different.

As with the first reference magnetic field Bref1, the second reference magnetic field Bref2 relating to the estimated orientation of the lever may be determined by interpolation from the predetermined and stored values of the second reference magnetic field Bref2 respectively associated with the reference orientation values of the lever or selected from among these values of the second reference magnetic field Bref2 as a function of the reference orientation closest to the estimated orientation.

The second predetermined function F2 makes it possible to characterize the second vector difference between the current magnetic field Bc and the second reference magnetic field Bref2 that has been previously determined at the position of the measuring device for the estimated orientation of the lever.

The second predetermined function F2 is therefore a function of the three measured components of the current magnetic field Bc, the values of the second reference magnetic field Bref2 and an estimated orientation of the lever. As such, the second predetermined function F2 is different from the first predetermined function F1.

The second predetermined function F2 supplies, as a result, the value of a second norm N2 of this second vector difference between the current magnetic field Bc and the second reference magnetic field Bref2 relating to the estimated orientation. This second predetermined function F2 can be calculated by the calculator of the monitoring system.

As with the first norm N1, the second norm N2 may, for example, be a Euclidean norm or an infinite norm, or even another norm, optionally using strictly positive constants a', b' and c' to characterize the anisotropy of the measurement accuracy of the measuring device. In particular, the first norm N1 and the second norm N2 may be identical, the constants a', b' and c' then being equal to the constants a, b and c respectively.

The calculator of the monitoring system is then configured to compare the second norm N2 with a second magnetic field threshold. The second magnetic field threshold has been previously defined, for example by tests and/or simulations. The monitoring system can then signal that the lever is in the actuated position relative to the actuation axis Z, for example by means of the alarm, when the second norm N2 is lower than the second magnetic field threshold for a duration greater than the duration threshold.

The second magnetic field threshold may be less than, or even equal to, the first magnetic field threshold.

The present disclosure also relates to a method for monitoring a control device as previously described. The control device is thus provided with a lever, articulated to a support and able to move, at least in rotation, relative to the support, about an axis X, Y. The lever is provided with one or more magnetic dipoles and the control device comprises a measuring device configured to measure three components of a magnetic field B generated by the one or more magnetic dipoles at a position of the measuring device.

A calculator integrated into the control device or external to the control device may comprise a memory or be connected to a memory, this memory being able, for example, to store instructions or algorithms that make it possible to carry out the monitoring method when they are executed. The memory may also store a computer program intended to be run by the calculator in order to implement the monitoring method.

The monitoring method according to the disclosure comprises the following steps:

measuring the three components of a current magnetic field Bc by the measuring device;

determining an estimated orientation of the lever relative to the support, as a function of the three components by applying a stored transformation law;

determining a first reference magnetic field Bref1 for the estimated orientation of the lever from predetermined and stored values of the first reference magnetic field Bref1, the values being respectively associated with reference orientations of the lever;

calculating a first predetermined function F1 as a function of the three measured components of the current magnetic field Bc, the estimated orientation of the lever and the first magnetic field Bref1 relating to this estimated orientation, the first predetermined function F1 having as a value a first norm N1 of a first vector difference between the first reference magnetic field Bref1 and the current magnetic field Bc; and signaling an anomaly using an alarm when the first predetermined function F1 is greater than a first magnetic field threshold for a duration greater than a duration threshold.

During the measurement step, the measuring device can supply, for each of the three components of the current magnetic field Bc, a raw signal or signals carrying raw measurements of these three components carried out by the measuring device, or even respectively by the three magnetic sensors that it comprises. The measuring device can alternatively comprise an internal calculator in order to process these raw measurements, for example via a conventional filtering or sampling, or even the application of transformations, and supply a processed signal or signals carrying the three components of the current magnetic field Bc as a function of these raw measurements thus processed.

During the step of determining an estimated orientation of the lever, this estimated orientation may be calculated by the calculator implementing the method as a function of the signal or signals supplied by the measuring device and carrying information relating to the three components of the current magnetic field Bc, by applying one or more transformation laws stored in the memory of the calculator or connected to this calculator. Alternatively, this estimated orientation of the lever can be computed by the internal calculator of the measuring device via the application of this or these transformation laws stored in a memory of the measuring device.

The calculator receives one or more signals, for example from the measuring device, and emits signals, for example to the alarm, that may be electrical or optical, digital or analog.

Then, during the step of determining a first reference magnetic field Bref1, this first reference magnetic field Bref1 relating to the estimated orientation of the lever is determined from predetermined and stored values of the first reference magnetic field Bref1 and respectively associated with reference orientations of the lever. The values of the first reference magnetic field Bref1 and the associated reference orientations are stored in a first database stored in the memory associated with the calculator of the control device. This first reference magnetic field Bref1 has been previously defined for a control device guaranteed to be fault-free.

During this step, the first reference magnetic field Bref1 relating to the estimated orientation of the lever can be determined by interpolation from the values of the first database of the first reference magnetic field Bref1 and the associated reference orientations of the lever.

Alternatively, the estimated orientation of the lever may be compared with the reference orientations of the lever in order to search, in a known manner, for the reference orientation closest to the estimated orientation. For this purpose, the step of determining a first reference magnetic field Bref1 may comprise a substep of comparing the estimated orientation and the reference orientations. Then, the value of the first reference magnetic field Bref1 associated with the reference orientation closest to the estimated orientation in the first database is selected by the method according to the disclosure.

During the calculation step, a first predetermined function F1 is calculated and has as its value a first norm N1, for example a Euclidean or infinite norm, of a first vector difference between the first reference magnetic field Bref1 relating to the estimated orientation of the lever and the current magnetic field Bc. This first norm N1 is therefore a function of the three measured components of the current magnetic field Bc, the estimated orientation of the lever and the previously determined value of the first reference magnetic field Bref1 relating to this estimated orientation.

Finally, a reporting step is carried out in order to report an anomaly using an alarm when the first predetermined function F1 is greater than a first magnetic field threshold for a duration greater than a duration threshold. This signaling may be visual, using an indicator light and/or an alarm screen, audible, via an alarm speaker, or haptic.

In this way, the monitoring method according to the disclosure makes it possible to monitor whether the estimated orientation of the lever is valid and can be reliably used to control, for example, the movement of a machine or a vehicle, such as an aircraft. The estimated orientation is considered valid when no abnormality is detected.

These steps can be repeated consecutively, in a continuous manner, for as long as the machine to which the control device is connected is operating, independently of the progress of these steps and of the values of the first predetermined function F1.

Alternatively, these steps may be repeated several times consecutively depending on the progress of these steps, and in particular as long as the first predetermined function F1 is simultaneously greater than the first magnetic field threshold and the duration is less than or equal to the duration threshold, or as long as the first predetermined function F1 is less than or equal to the first magnetic field threshold.

In addition, the duration that is compared with the duration threshold is initialized to an initial value stored during a first iteration of these steps. A prior initialization can therefore be carried out for this purpose, before these steps are carried out. This initial value of the duration is equal, for example, to zero.

This duration thus acts as a counter and is then incremented as a function of the time that elapses during the course of these steps.

An initialization of the duration to the initial value is also carried out, firstly, at each iteration, as long as the first predetermined function F1 is less than or equal to the first magnetic field threshold and, secondly, as soon as the first predetermined function F1 becomes simultaneously less than or equal to the first magnetic field threshold, after having been greater than this first magnetic field threshold, and the duration is less than or equal to the duration threshold.

The method according to the disclosure may also include one or more of the following features, taken individually or in combination.

According to one possibility, following the signaling of an anomaly, the monitoring method may comprise deactivation of the lever and activation of an emergency lever comprised by the control device.

More specifically, in the event of a detected anomaly, the lever can no longer be reliably used. In this way, this lever is deactivated, no control signal relating to the movement of this lever being emitted by the control device. Alternatively, the control signals emitted by the control device may be ignored.

In addition, an emergency lever of the control device may be activated through the emission of an activation signal by the calculator. The emergency lever can then be put into operation for use by an operator as a replacement for the defective lever. In this way, by means of the emergency lever, the control device can always control, for example, the movement of a machine or a vehicle, by emitting a control signal as a function of the one or more movements of this emergency lever.

According to one possibility compatible with the preceding possibilities, the monitoring method may comprise additional steps when the lever is able to move in translation along an actuation axis Z between a rest position and an actuated position, the lever being elongate in shape along this actuation axis Z. These additional steps make it possible to determine whether the lever is in the actuated position.

First, a second reference magnetic field Bref2 relating to the estimated orientation is determined by the calculator. This second reference magnetic field Bref2 is determined from predetermined and stored values of the second reference magnetic field Bref2 respectively associated with reference orientations of the lever, the second reference magnetic field Bref2 characterizing the actuated position along the axis of actuation Z of the lever, the control device being guaranteed to be fault-free. The value of this second reference magnetic field Bref2 relating to the estimated orientation may be determined, as with the first reference magnetic field Bref1, by interpolation of the predetermined and stored values of the second reference magnetic field Bref2 or selected from these predetermined and stored values of the second reference magnetic field Bref2 as a function of the reference orientation closest to the estimated orientation of the lever.

Then, a calculation of a second predetermined function F2 is carried out by the calculator as a function of the three measured components of the current magnetic field Bc, the estimated orientation of the lever and the second reference magnetic field Bref2 relating to this estimated orientation.

This second predetermined function F2 has as its value a second norm N2, for example a Euclidean or infinite norm, of a second vector difference between the second reference magnetic field Bref2 and the current magnetic field Bc.

Finally, a determination of the actuated position of the lever is carried out when the second predetermined function F2 is below a second magnetic field threshold.

These steps are preferably repeated several times consecutively and in a continuous manner.

BRIEF DESCRIPTION OF THE DRAWINGS

The disclosure and its advantages appear in greater detail from the following description of examples given by way of illustration with reference to the accompanying figures, wherein.

DETAILED DESCRIPTION

Elements present in more than one of the figures are given the same references in each of them.

Figure 1:
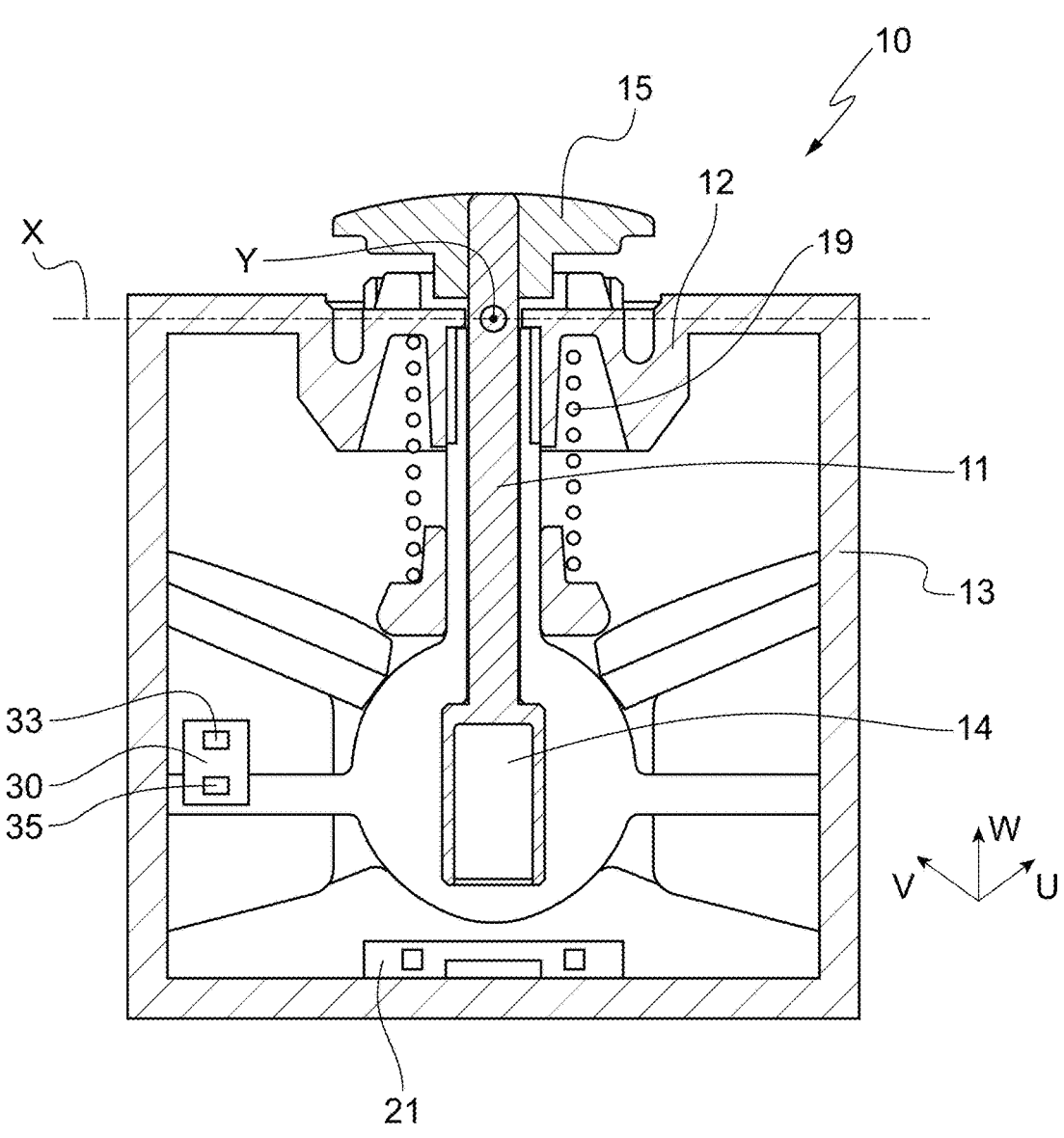
FIG. 1 is a view of a control device according to the disclosure.
Figure 2:
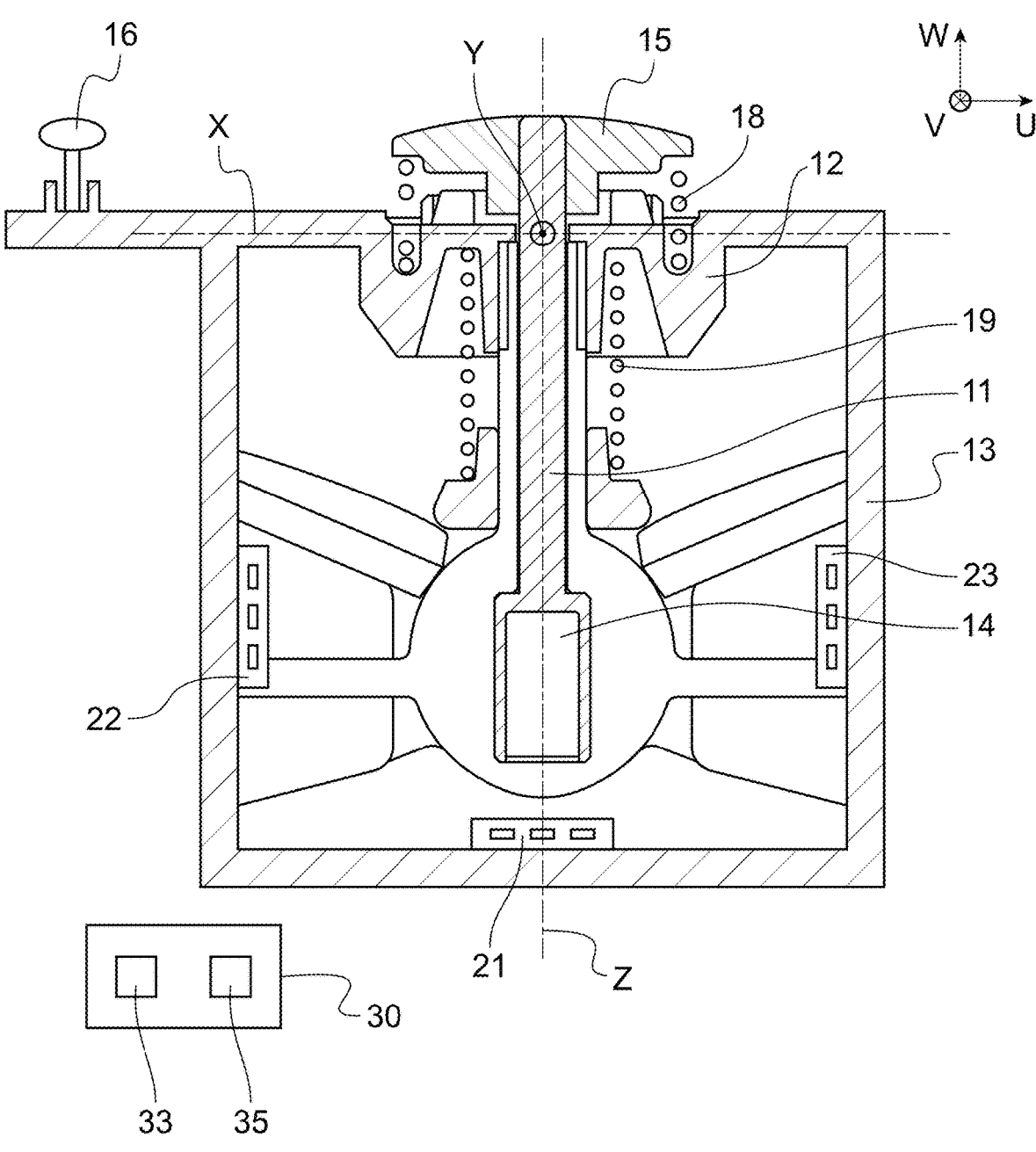
FIG. 2 is a view of a control device according to the disclosure.

FIGS. 1 and 2 represent two examples of a control device according to the disclosure.

Regardless of the embodiment of the disclosure, a control device 10 comprises a support 12 and a lever 11 articulated to this support 12, and able to move, at least in rotation, relative to this support 12 about at least one movement axis, or even a plurality of movement axes. The lever 11 is provided with one or more magnetic dipoles 14 positioned, for example, at one of its ends. A magnetic dipole 14 may comprise a permanent magnet or an electromagnet configured to be powered by an electric current.

The control device 10 comprises at least one measuring device 21-23 configured to measure three components of a magnetic field B generated by the one or more magnetic dipoles 14 at the position of this measuring device 21-23. The measuring device 21-23 can comprise three magnetic sensors in order to respectively measure these three components of a magnetic field B. These magnetic sensors are for example Hall effect sensors and can thus form a three-axis teslameter.

These three components of the magnetic field B are measured respectively in three non-coplanar measurement directions U, V and W, forming a reference frame (U, V, W) integral with the support 12. These three measurement directions U, V and W are, for example, orthogonal in pairs.

Such a sensor can supply a raw signal carrying raw measurements made by this magnetic sensor. The measurement device 21-23 may also comprise an integrated calculator to process these raw measurements, for example via conventional filtering or sampling, or the application of transformations, and supply a processed signal carrying these processed raw measurements.

The control device 10 also comprises a monitoring system 30 configured to monitor the integrity of the control device 10. The monitoring system 30 may comprise a calculator 33 and an alarm 35.

The control device 10 may comprise a housing 13 wherein the lever 11, the one or more magnetic dipoles 14 and the one or more measuring devices 21-23 are disposed, in particular at least partially. The support 12 is then attached to the housing 13. The housing 13 may comprise a conventional magnetic insulator so that the interior of this housing 13 is magnetically insulated from the external environment, and thus protected, for example, from the earth magnetic field or from any magnetic field wherein the control device 10 according to the disclosure may be positioned. In this case, the measuring device 21-23 can measure the magnetic field B generated by the one or more magnetic dipoles 14 without it being disturbed or modified by another magnetic field.

The control device 10 according to the disclosure may be integrated or connected to a machine, for example to control the movements of an element of the machine, or even of the machine as a whole. The control device 10 according to the disclosure can also be integrated into a vehicle, in particular an aircraft. The control device 10 can, for example, be connected by a wired or wireless link to a piloting system of an aircraft to control the movements of this aircraft.

In a first example shown in FIG. 1, the lever 11 is mounted to move in rotation relative to the support 12 about a first axis X and a second axis Y. The first and second axes X, Y are not parallel and are, for example, perpendicular to each other. The control device 10 may include a first resilient return device 18 configured to hold or return the lever 11 to an equilibrium position about the first and second axes X, Y. The control device 10 according to this first example comprises a single measuring device 21 positioned in the housing 13. The monitoring system 30 is arranged inside the housing 13 of the control device 10.

According to this first example, the three measurement directions U, V and W are not parallel to the first and second axes X, Y.

According to a second example shown in FIG. 2, the lever 11 is elongate in shape along an actuation axis Z. The lever 11 is able to move in rotation relative to the support 12 about a first axis X and a second axis Y, which axes are not parallel or even perpendicular to each other, as well as in translation along the actuation axis Z between a rest position and an actuated position. The actuation axis Z is secant to a plane formed by the first and second axes X, Y. According to this second example, the three measurement directions U, V and W are respectively parallel to the first and second axes X, Y as well as to the actuation axis Z, when the lever 11 is in an equilibrium position about the first and second axes X, Y.

The control device 10 comprises a first resilient return device 18 configured to return the lever 11 to the equilibrium position about the first and second axes X, Y, as well as a second resilient return device 19 configured to maintain or return the lever 11 to the neutral position along the actuation axis Z. The control device 10 comprises three measuring devices 21-23 positioned at different positions in the housing 13. These three measuring devices 21-23 can be used simultaneously in order to provide a measurement of the magnetic field B established in a known manner by combining the measurements of these three measuring devices 21-23, or redundantly in order to compensate for a possible failure of one of these measuring devices 21-23. The monitoring system 30 is arranged outside the housing 13 of the control device 10.

The first and second resilient return devices 18, 19 may, for example, comprise one or more springs.

According to the two examples shown, the control device 10 comprises a control member 15 integral with the lever 11, and fixed to the lever 11 at an end opposite the end comprising the magnetic dipole 14. The control member 15 allows an operator to move the lever 11 around the first and/or second axis X, Y, or even along the actuation axis Z if applicable. The control member 15 shown in FIGS. 1 and 2 may be manipulated by means of a finger, for example the thumb of an operator. A control member 15 may alternatively comprise a gripping area to be held and moved by means of the hand of an operator.

Independently of the two examples shown, the alarm 35 of the monitoring system 30 may comprise one or more indicator lights, a screen and/or a loudspeaker. The calculator 33 of the monitoring system 30 may include, for example, at least one processor, even at least one memory, at least one integrated circuit, at least one programmable system, or at least one logic circuit, these examples not limiting the scope to be given to the term "calculator". The term "processor" may equally well be used to designate a central processing unit known by the acronym CPU, a graphics processing unit GPU or a known digital unit.

The calculator 33 is connected by wired or wireless means to the measuring device 21-23 and to the alarm 35. Electrical or optical, analog or digital, signals can then be exchanged between the calculator 33 and, on the one hand, the measuring device 21-23 and, on the other hand, the alarm 35.

Moreover, instructions or a computer program may be stored in a memory of the calculator 33 or in a memory connected to this calculator 33. The calculator 33 can then execute these instructions or this computer program in order to implement a method for monitoring the control device 10 in order to monitor its integrity.

Figure 3:
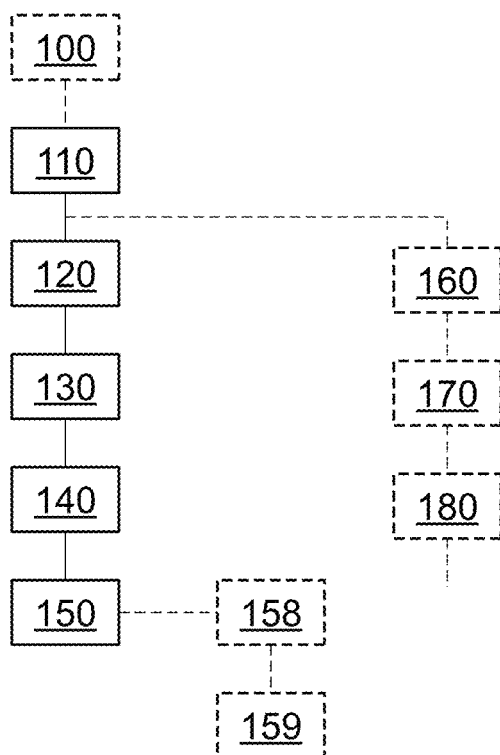
FIG. 3 is a block diagram of a method according to the disclosure.

FIG. 3 shows a block diagram of this method for monitoring the control device 10. The method may comprise the following steps.

First, a measurement 110 of the three components of a current magnetic field Bc generated by the magnetic dipole 14 is performed by the measuring device 21-23. The measuring device 21-23 can transmit a signal to the calculator 33, carrying information relating to these three components of the current magnetic field Bc.

Then, a determination 120 of an estimated orientation of the lever 11 relative to the support 12 is made, for example by the calculator 35. This estimated orientation of the lever 11 is determined as a function of the three components of the current magnetic field Bc using a transformation law stored in the memory connected to the calculator 35 or the memory of the calculator 35.

A determination 130 of a first reference magnetic field Bref1 for the estimated orientation is then made by the calculator 35 from predetermined and stored values of the first reference magnetic field Bref1, the three components of a current magnetic field Bc and the estimated orientation of the lever 11. The predetermined and stored values of the first reference magnetic field Bref1 are respectively associated with reference orientations of the lever 11 and comprise three components according to the measurement directions U, V and W for each first reference magnetic field Bref1. A predefined discretization step separates the reference orientations of the lever 11.

The predetermined and stored values of this first reference magnetic field Bref1 have been previously defined for a control device 10 guaranteed to be fault-free, and are stored, with the reference orientations of the lever 11, in the memory of the calculator 33 or connected to the calculator 33. The predetermined and stored values of this first reference magnetic field Bref1 thus characterize so-called "normal" or "nominal" positions of the magnetic dipole 14, and consequently of the lever 11, namely when the lever 11, and consequently the control device 10, operate correctly. The predetermined and stored values of this first reference magnetic field Bref1 have, for example, been measured by the measuring device 21-23 and form a first database with the reference orientations.

The first reference magnetic field Bref1 relating to the estimated orientation of the lever 11 can be determined by the calculator 33 by interpolation from these values of the first reference magnetic field Bref1 and the associated stored reference orientations of the lever, in order to deduce therefrom the first reference magnetic field Bref1 corresponding to the estimated orientation of the lever 11.

Alternatively, a substep of comparing the estimated orientation of the lever 11 and the reference orientations of the first database may be carried out by the calculator 33 in order to find, in a known manner, the reference orientation closest to the estimated orientation. Then, a substep of selecting the value of the first reference magnetic field Bref1 associated with this reference orientation closest to the estimated orientation is performed by the calculator 33.

Subsequently, a calculation 140 of a first predetermined function F1 is performed by the calculator 33 as a function of the three measured components of the current magnetic field Bc, the estimated orientation of the lever 11 and the first reference magnetic field Bref1 relating to the estimated orientation. The first predetermined function F1 has as its value a first norm N1 of a first vector difference between the first reference magnetic field Bref1 and the current magnetic field Bc.

For example, this first norm N1 may be a Euclidean norm or a so-called "infinite" norm, or even another norm. Moreover, the anisotropy of the measurement accuracy of the measuring device 21-23 can be taken into account by this first norm N1 via strictly positive constants a, b and c. In this case, the first norm N1 may for example be written, for the first vector difference of coordinates (u, v, w) in the reference frame (U, V, W), according to the formulas $N = \max(a \cdot |u|, \ b \cdot |v|, \ c \cdot |w|)$ for an infinite norm, and $N = \sqrt{a \cdot u^2 + b \cdot v^2 + c \cdot w^2}$, for a Euclidean norm.

Finally, signaling 150 of an anomaly is performed via the alarm 35 when the first predetermined function F1 is greater than a first magnetic field threshold for a duration greater than a duration threshold. For this purpose, the calculator 33 emits a signal that is transmitted to the alarm 35, this signal carrying information of the presence of such an anomaly.

The first predetermined function F1 is greater than the first magnetic field threshold when the magnetic dipole 14, and therefore the lever 11, is moved away from its nominal position. This state may be transient, for example during manipulation and movement of the lever 11. Thus, if this state is maintained for a duration less than the duration threshold, no anomaly is signaled. On the other hand, if this state is maintained for a duration greater than the duration threshold, then the lever 11 has remained away from the nominal position for too long, that may be a sign of the presence of a fault, such as deformation or breaking of the lever 11.

This signal 150 thus makes it possible to visually, audibly or even haptically signal the anomaly to an operator. In this way, the monitoring method according to the disclosure makes it possible to monitor whether the estimated orientation of the lever 11 complies with the nominal positions and is therefore valid.

In this case, the control device 10 can then emit a signal carrying information relating to this estimated orientation of the lever 11 that can be reliably used to control, for example, the movement of a machine or a vehicle.

These steps 110-150 can be applied to the two examples of control device 10 shown in FIGS. 1 and 2, in particular independently of an ability to move the lever 11 in translation along actuation axis Z.

These steps 110-150 can be repeated several times consecutively depending on their progress, and in particular as long as the lever 11 is moved away from its nominal position transiently, i.e., the first predetermined function F1 is greater than the first magnetic field threshold and the duration is less than or equal to the duration threshold. These steps 110-150 can also be repeated as long as the lever 11 is close to its nominal positions, i.e., the first predetermined function F1 is less than or equal to the first magnetic field threshold. The duration threshold is, for example, equal to 500 milliseconds.

Moreover, the method of the disclosure can include an initialization 100 of the duration wherein this method takes place. During this initialization, the duration is modified to be equal to an initial value, stored in the memory of the calculator 33 or connected to the calculator 33. This initial value of the duration is equal, for example, to zero.

This initialization 100 can be performed by means of the calculator 33, during a first iteration of these steps 110-150.

An initialization 100 may also be carried out at each iteration of these steps 110-150, as long as the lever 11 is close to its nominal positions, i.e., as long as the first predetermined function F1 is less than or equal to the first magnetic field threshold. An initialization 100 can also be performed as soon as the lever 11 approaches its nominal positions after having moved away therefrom, i.e., as soon as the first predetermined function F1 becomes less than or equal to the first magnetic field threshold, after having been greater than this first magnetic field threshold, the duration being less than or equal to the duration threshold. Thus, the duration is not initialized as long as the lever 11 is moved away from its nominal position transiently, i.e., the first predetermined function F1 is greater than the first magnetic field threshold and the duration is less than or equal to the duration threshold.

During the course of these steps 110-150, and in the absence of initialization 100, the duration increases as a function of the time elapsed.

In addition, in the event of a detected anomaly, the signaling 150 may include deactivation 158 of the lever 11 and activation 159 of an emergency lever 16 of the control device 10. In this way, following the detection of an anomaly, the control device 10 cannot supply, via the lever 11, reliable information relating to the estimated orientation of the lever 11. Consequently, deactivation 158 of the lever 11 has the effect of inhibiting the emission of a control signal from the control device 10. Alternatively, the calculator 33 may emit a specific signal so that the control signals emitted by the control device 10 are ignored.

Then, the activation 159 of an emergency lever 16 is effective, for example following the emission of an activation signal by the calculator 33. This activation 159 of the emergency lever 16 makes it possible to put the emergency lever 16 of the control device 10 into operation. In this way, the control device 10 remains operational, by virtue of the emergency lever 16, in order to control, for example, the movement of a machine or a vehicle, by emitting a control signal as a function of the one or more movements of this emergency lever 16.

The monitoring method according to the disclosure may also comprise, in the case of the exemplary control device 10 shown in FIG. 2, the following additional steps 160-180 for determining the actuated position of the lever 11. These additional steps 160-180 make it possible to determine whether the lever 11 is in the actuated position.

First, a second reference magnetic field Bref2 for the estimated orientation of the lever 11 is determined 160 by the calculator 33, from predetermined and stored values of this second reference magnetic field Bref2 associated respectively with the reference orientations of the lever 11, and as a function of the estimated orientation of the lever and of the measured components of the current magnetic field Bc. This second reference magnetic field Bref2 characterizes the actuated position of the lever 11 along the actuation axis Z, the control device 10 being guaranteed to be fault-free. These predetermined and stored values of the second reference magnetic field Bref2 have been previously defined for a control device 10 guaranteed to be fault-free, and are stored, with the reference orientations of the lever 11, in the memory of the calculator 33 or connected to the calculator 33.

The predetermined and stored values of this second reference magnetic field Bref2 have, for example, been measured by the measuring device 21-23 and form a second database with the reference orientations.

The value of this second reference magnetic field Bref2 relating to the estimated orientation may be determined, as for the first reference magnetic field Bref1, by interpolation of the predetermined and stored values of the second reference magnetic field Bref2 or selected from these values of the second reference magnetic field Bref2 as a function of the reference orientation closest to the estimated orientation of the 11 lever.

Then, a calculation 170 of a second predetermined function F2 is carried out by the calculator 33 as a function of the three measured components of the current magnetic field Bc, the estimated orientation of the lever 11 and the predetermined and stored values of the second reference magnetic field Bref2. The second predetermined function F2 has as its value a second norm N2 of a second vector difference between the second reference magnetic field Bref2 and the current magnetic field Bc.

As with the first norm N1, the second norm N2 can be a Euclidean norm or an infinite norm, or even another norm. In addition, the anisotropy of the measurement accuracy of the measuring device 21-23 can be taken into account via strictly positive constants a', b' and c'. In this case, the second norm N2 may for example be written, for the second vector difference of coordinates (u', v', w') in the reference frame (U, V, W), according to the formulas $N2=\max(a'\cdot|u|, b'\cdot|v'|, c'\cdot|w'|)$ for an infinite norm, and $N2=\sqrt{a'\cdot u'^2+b'\cdot v'^2+c'\cdot w'^2}$, for a Euclidean norm.

Finally, a determination 180 of the actuated position of the lever 11 is performed using the calculator 33 when the second predetermined function F2 is less than a second magnetic field threshold.

During determination 180 of the actuated position of the lever 11, the monitoring system 30 may signal that the lever 11 is in the actuated position along the actuation axis Z, by means of the alarm 35, the calculator 33 emitting a signal carrying such information to the alarm 35. Alternatively, or in a complementary manner, the control device 10 may transmit a signal carrying information relating to the estimated orientation of the lever 11 and to this actuated position of the lever 11.

These additional steps 160-180 are repeated several times consecutively, depending on their progress. These additional steps 160-180 may be performed in parallel with steps 130-150 relating to the detection of an anomaly on the lever 11, or sequentially with these steps 130-150. No initialization 100 of the duration is carried out as a function of the progress of these additional steps 160-180.

Naturally, the present disclosure may be subjected to numerous variations as to its implementation. Although several embodiments are described above, it should readily be understood that it is not conceivable to identify exhaustively all the possible embodiments. It is naturally possible to replace any of the means described with equivalent means without going beyond the ambit of the present disclosure.

What is claimed is:

1. A control device provided with a lever articulated to a support, the lever being provided with at least one magnetic dipole and able to move, at least in rotation, relative to the support about an axis, the control device comprising a measuring device configured to measure three components of a magnetic field generated by the magnetic dipole(s) at a position of the measuring device, the control device comprising a monitoring system for monitoring the control device, wherein the monitoring system is configured to signal an anomaly using an alarm when a first predetermined function is greater than a first magnetic field threshold for a duration greater than a duration threshold, and wherein the first predetermined function is a function of the three measured components of a current magnetic field and of an estimated orientation of the lever, the first predetermined function having as its value a first norm of a first vector difference between the current magnetic field and a first reference magnetic field determined at the position of the measuring device, the first reference magnetic field relating to the estimated orientation.

2. The control device according to claim 1, wherein the lever is elongate in shape along an actuation axis and able to move in translation along the actuation axis between a rest position and an actuated position.

3. The control device according to claim 2, configured to detect whether the lever is in the actuated position when a second predetermined function is less than a second magnetic field threshold, the second predetermined function being a function of the three measured components of the current magnetic field and of the estimated orientation of the lever, the second predetermined function having as its value a second norm of a second vector difference between the current magnetic field and a second reference magnetic field determined at the position of the measuring device, the second reference magnetic field relating to the estimated orientation.

4. The control device according to claim 1, wherein the first reference magnetic field relating to the estimated orientation is either determined by interpolation from predetermined and stored values of the first reference magnetic field respectively associated with reference orientation values of the lever, or selected from the predetermined and stored values of the first reference magnetic field respectively associated with reference orientation values of the lever, the selected value being associated with the reference orientation closest to the estimated orientation.

5. The control device according to claim 1, wherein the first norm is expressed for a vector of coordinates according to the following formula max $(a\cdot|u|, b\cdot|v|, c\cdot|w|)$, where the constants a, b and c are strictly positive.

6. A method for monitoring a control device provided with a lever articulated to a support, the lever being provided with at least one magnetic dipole and able to move, at least in rotation, relative to the support about an axis, the control device comprising a measuring device configured to measure three components of a magnetic field generated by the magnetic dipole(s) at a position of the measuring device, wherein the monitoring method comprises the following steps:

measuring the three components of a current magnetic field by the measuring device;

determining an estimated orientation of the lever relative to the support, as a function of the three components by applying a stored transformation law;

determining a first reference magnetic field for the estimated orientation from predetermined and stored values of the first reference magnetic field, the values being respectively associated with reference orientations of the lever;

calculating a first predetermined function as a function of the three measured components of the current magnetic field, the estimated orientation of the lever and the first reference magnetic field relating to the estimated orientation, the first predetermined function having as its value a first norm of a first vector difference between the first reference magnetic field and the current magnetic field; and signaling an anomaly using an alarm when the first predetermined function is greater than a first magnetic field threshold for a duration greater than a duration threshold.

7. The monitoring method according to claim 6, the lever being elongate in shape along an actuation axis and able to move in translation along the actuation axis between a rest position and an actuated position, the method comprising the following additional steps for determining the actuated position of the lever:

determining a second reference magnetic field for the estimated orientation from predetermined and stored values of the second reference magnetic field respectively associated with reference orientations of the lever, the second reference magnetic field characterizing the actuated position along the actuation axis of the lever;

calculating a second predetermined function as a function of the three measured components of the current magnetic field, of the estimated orientation of the lever and of the second reference magnetic field, the second predetermined function having as its value a second norm of a second vector difference between the second reference magnetic field and the current magnetic field; and determining the actuated position of the lever when the second predetermined function is less than a second magnetic field threshold.

8. A method according to claim 6, wherein the determination is carried out either by interpolation from predetermined and stored values of the first reference magnetic field respectively associated with a plurality of reference orientation values of the lever, or by selection from the predetermined and stored values of the first reference magnetic field respectively associated with a plurality of reference orientation values of the lever, the selected value corresponding to the reference orientation that is closest to the estimated orientation.

9. The method according to claim 6, wherein the signaling comprises deactivation of the lever and activation of an emergency lever comprised in the control device.

10. A control method according to claim 6, wherein the first norm is expressed for a vector of coordinates according to the following formula max (a|u|, b|v|, c|w|), where the constants a, b and c are strictly positive.

* * * * *